(12) United States Patent
Jones

(10) Patent No.: US 6,961,373 B2
(45) Date of Patent: Nov. 1, 2005

(54) METHOD AND APPARATUS FOR CHANNEL EQUALIZATION

(75) Inventor: William Jones, San Diego, CA (US)

(73) Assignee: SolarFlare Communications, Inc., Irvine, CA (US)

( * ) Notice: Subject to any disclaimer, the term of this patent is extended or adjusted under 35 U.S.C. 154(b) by 350 days.

(21) Appl. No.: 10/188,274

(22) Filed: Jul. 1, 2002

(65) Prior Publication Data

US 2004/0001540 A1 Jan. 1, 2004

(51) Int. Cl.$^7$ ................................................. H03H 7/30

(52) U.S. Cl. ....................... 375/232; 375/233; 375/231; 360/65

(58) Field of Search ................................ 375/232, 233, 375/231; 360/65

(56) References Cited

U.S. PATENT DOCUMENTS

| | | |
|---|---|---|
| 4,359,778 A | 11/1982 | Lee |
| 4,583,235 A | 4/1986 | Dömer et al. |
| 4,956,838 A | 9/1990 | Gilloire et al. |
| 5,222,084 A | 6/1993 | Takahashi |
| 5,305,307 A | 4/1994 | Chu |
| 5,633,863 A | 5/1997 | Gysel et al. |
| 5,646,958 A | 7/1997 | Tsujimoto |
| 5,856,970 A | 1/1999 | Gee et al. |
| 5,896,452 A | 4/1999 | Yip et al. |
| 6,088,827 A | 7/2000 | Rao |
| 6,147,979 A | 11/2000 | Michel et al. |
| 6,160,790 A | 12/2000 | Bremer |
| 6,167,082 A | 12/2000 | Ling et al. |
| 6,201,831 B1 | 3/2001 | Agazzi et al. |
| 6,226,332 B1 | 5/2001 | Agazzi et al. |
| 6,249,544 B1 | 6/2001 | Azazzi et al. |
| 6,252,904 B1 | 6/2001 | Agazzi et al. |
| 6,253,345 B1 | 6/2001 | Agazzi et al. |
| 6,259,729 B1 * | 7/2001 | Seki ............................. 375/231 |
| 6,272,173 B1 | 8/2001 | Hatamian |
| 6,351,531 B1 | 2/2002 | Tahernezhaadi et al. |
| 6,356,555 B1 | 3/2002 | Rakib et al. |
| 6,480,532 B1 | 11/2002 | Vareljian |
| 6,493,448 B1 | 12/2002 | Mann et al. |
| 6,584,160 B1 | 6/2003 | Amrany et al. |
| 6,618,480 B1 | 9/2003 | Polley et al. |
| 6,665,402 B1 | 12/2003 | Yue et al. |
| 6,751,255 B1 * | 6/2004 | Reuven et al. ............... 375/233 |
| 2001/0036160 A1 | 11/2001 | Curran et al. |

(Continued)

OTHER PUBLICATIONS

Wu, S.,Boyd, S., Vandenberghe, L.;FIR Filter Design via Spectral Factorization and Convex Optimization; Chapter 1 of Applied Computational Control, Signal and Communications; Biswas Datta editor; 1997; www.stanford.edu/~boyd/reports/magdes.pdf; pp. 1–33.*

(Continued)

*Primary Examiner*—Stephen Chin
*Assistant Examiner*—Sudhanshu C. Pathak
(74) *Attorney, Agent, or Firm*—Weid & Miller, Ltd.

(57) ABSTRACT

A method and apparatus is disclosed to overcome the effects of intersymbol interference during data transmission. Overcoming the effects of intersymbol interference makes possible higher data transmission rates for a given error rate. In one embodiment a receiver-transmitter pair is configured with a precode filter at the transmit side and a feed forward filter and a feedback filter at the receive side. Filter coefficients are calculated to reduce the undesirable effects of the channel, such as intersymbol interference. In one embodiment a training process occurs with the feedforward filter and a feedback filter, such that the first N coefficients of the feedback filter are set to zero. Thereafter, the coefficients of the feedforward filter are subject to spectral factorization and separated into minimum phase roots and maximum phase roots. The minimum phase roots comprise the precode filter coefficients and the maximum phase roots are established as feedforward filter coefficients.

25 Claims, 7 Drawing Sheets

U.S. PATENT DOCUMENTS

| | | | |
|---|---|---|---|
| 2002/0067824 A1 | | 6/2002 | Wang |
| 2002/0106016 A1 | | 8/2002 | Egelmeers et al. |
| 2002/0176492 A1 | * | 11/2002 | Zangi et al. ............... 375/233 |
| 2002/0191552 A1 | | 12/2002 | Watkinson |
| 2003/0067888 A1 | | 4/2003 | Bina et al. |
| 2004/0125487 A9 | * | 7/2004 | Sternad et al. ............ 360/65 |

OTHER PUBLICATIONS

Defination of Minimum Phase; www–ccrma.stanford. edu/~jos/filters/Definition_Minimum_Phase.html.*

FIR filter optimization as pre–emphasis of high–speed backplane data transmission; Li, M.; Wang, S., Tao, T., Kawasniewski, T.; Electronics Letters; Jul. 8, 2004; vol. 40, No. 14.*

Oscar Agazzi, et al., "10Gb/s PMD Using PAM–5 Trellis Coded Modulation", Broadcom, *IEEE* 802.3, Albuquerque, New Mexico, Mar. 6–10, 2000, 38 pages.

Jamie E. Kardontchik, "4D Encoding in Level–One's Proposal for 1000BAS–T", Advanced Micro Devices, Aug. 21, 1997—Rev. B, pp. 1–24.

Erich F. Haratsch, et al., "A 1–Gb/s Joint Equalizer and Trellis Decoder for 1000BASE–T Gigabit Ethernet", *IEEE Journal of Solid–State Circuits*, vol. 36, No. 3, Mar. 2001, pp. 374–384.

Mehdi Hatamian, et al., "Design Considerations for Gigabit Thernet 1000Base–T Twisted Pair Transceivers", IEEE 1998 Custom Integrated Circuits Conference, pp. 335–342.

Gottfried Ungerboeck, "Trellis–Coded Modulation with Redundant Signal Sets", *IEEE Communications Magazine*, Feb. 1987, vol. 25, No. 2, pp. 5–21.

"Gigabit Ethernet Over Category 5", Copyright 2000–2001 Agilent Technologies, 12 pages.

M.P. Sellers, et al., "Stabilized Precoder for Indoor Radio Communications", *IEEE Communications Letters*, vol. 4, No. 10, Oct. 2000. pp. 315–317.

"Wirescope 350—Understanding ELFEXT", © 2000 Agilent Technologies, 2 pages.

David Crawford, "Adaptive Filters", © David Crawford 1996, pp. 1–5.

David A. Johns, et al., "Integrated Circuits for Data Transmission Over Twisted–Pair Channels", *IEEE Journal of Solid–State Circuits*, vol. 32, No. 3, Mar. 1997, pp. 398–406.

Prof. David Johns, University of Toronto, "Equalization", © D.A. Johns 1997, 29 pages.

David Smalley, "Equalization Concepts: A Tutorial", Atlanta Regional Technology Center, Texas Instruments, pp. 1–29, Oct. 1994.

Shao–Po Wu, et al., "FIR Filter Design via Spectral Factorization and Convex Optimization", to appear as Chapter 1 of *Applied Computational Control, Signal and Communications*, Biswa Datta Editor, Birkhauser, 1977, pp. 1–33.

Richard D. Wesel, et al., "Achievable Rates for Tomlinson-Harashima Precoding", *IEEE Transactions on Information Theory*, vol. 44, No. 2, Mar. 1998, pp. 824–831.

Wolfgang H. Gerstacker, et al., "Blind Equalization Techniques for xDSL Using Channel Coding and Precoding", submitted to AEÜ Int. J. Electr. Commun., pp. 1–4, May 1999.

Chip Fleming, "A Tutorial on Convolutional Coding with Viterbi Decoding", © 1999–2002, Spectrum Applications, pp. 1–6.

"ELFEXT—Introduction", Fluke Networks™, ©2000, pp. 1–2.

"Iowegian's dspGuru FIR FAQ Part 2: Properties", © 1999–2000 Iowegian International Corp., pp. 1–4.

"28.5 Protocol Implementation Conformance Statement (PICS) Proforma for Clause 28, Physical Layer Link Signaling for 10 Mb/s, 100 Mb/s and 1000 Mb/s Auto–Negotiation on Twisted Pair", *IEEE Std. 802.3*, 1998 Edition, pp. 6–14 and 18–44.

M. Tomlinson, "New automatic equalizer employing modulo arithmetic," *Electronic Letters*, vol. 7, pp. 138–139, 1971.

H. Harashima and H. Miyakawa, "Matched–transmission technique for channels with intersymbol interference," *IEEE Transactions on Communications*, vol. COM–20, No. 4, pp. 774–780, Aug. 1972.

P. Kabal and S. Pasupathy, "Partial–response signaling," *IEEE Transactions on Communications*, vol. COM–23, No. 9, pp. 921–934, Sep. 1975.

R. F. H. Fischer, W. H. Gerstacker, and J. B. Huber, "Dynamics limited precoding, shaping, and blind equalization for fast digital transmission over twisted pair lines," *IEEE Journal on Selected Areas in Communications*, vol. 13, No. 9, pp. 1622–1633, Dec. 1995.

R. F. H. Fischer and J. B. Huber, "Comparison of precoding schemes for digital subscriber lines," *IEEE Transactions on Communications*, vol. 45, No. 3, pp. 334–343, Mar. 1997.

* cited by examiner

METHOD AND APPARATUS FOR CHANNEL EQUALIZATION

FIELD OF THE INVENTION

The invention relates to communication systems and in particular to a method and apparatus for channel equalization.

RELATED ART

Demand for high rate data transmission continues to increase in response to new service offerings and expanded communication network usage, such as for home and business tasks. For example, audio and video content is generally bandwidth intensive. In addition, many tasks are now commonly handled via a computer network, such as over the Internet, including ordering business supplies, exchanging documents, or information gathering. Moreover, bandwidth demand placed upon a companies local area network is increasing. Often networks are being burdened with more users and larger and more complex software applications. These applications are bandwidth intensive and the complex software applications create larger files. Although many networks are currently at bandwidth capacity additional demands are continually being placed on these networks.

While there are numerous proposed solutions to alleviate network congestion by increasing network speeds, many of these proposed solutions involve adoption of a different communication standard or a different communication medium. While different communication standards (SONET, ATM) and different communication mediums (fiber optic cable, coaxial cable) may make it possible to increase data rates, the cost associated with migration is extremely prohibitive. For example, installation of an optical based network, i.e., 10G Ethernet on fiber or a SONET compatible network, to each computer in a local area network would require significant software and hardware upgrades on each end user's platform. The cost associated with cable installation as well as the retraining of service personnel alone is tremendous.

Another proposed solution is to increase the transmission rate of existing networks. One widely deployed network standard is the version of Ethernet that utilizes twisted pairs of copper wire as its transmission medium. Although widely deployed and inexpensive to manufacture, twisted pair copper is bandwidth limited. As a result, data signals transmitted at very high rates in the gigabit per second range over the twisted pair copper, or other medium, are subject to significant levels of distortion. Upon reception, recovering the transmitted signal may be impossible due to this distortion.

While it is possible to perform signal processing on the distorted signal, or even perform processing on the signal prior to transmission to counter the effects of the distortion, such prior art attempts have been insufficient to achieve very high data transmission rates with acceptable error rates.

For example, certain prior art solutions propose utilizing a decision feedback equalizer (DFE) at the receiver. The DFE may operate in conjunction with a slicer, to determine a voltage level of the signal at a particular sampling time. The slicer output is fed back to the DFE as a feedback signal to aid in subsequent decisions. While the DFE with slicer feedback is capable of decreasing the error rate under certain conditions, it suffers from catastrophic failure when presented with a string of slicer errors as feedback to the DFE. Catastrophic failure is even more likely when error correction is adopted. This is not an acceptable solution and generally will not fall within the specifications set forth by most communication standards.

As a result, there is a need for a method and apparatus capable of overcoming the data rate limiting effects of a channel.

SUMMARY

The method and apparatus described herein overcomes the drawbacks of the prior art by providing a method and apparatus for signal processing to compensate for the effects of signal transmission through a channel. In one embodiment a transmitter is configured to communicate with a receiver via one or more communication channels. The receiver may be configured with a feedforward filter and a feedback filter while the transmitter is configured with a precode filter. Filter operation is controlled by coefficient values. Based on the coefficient calculation process described herein a method and apparatus for filtering is disclosed that overcomes the drawbacks of the prior art. In an example environment of a communication system, the method and apparatus for filtering described herein is utilized for equalization to compensate for the effects of intersymbol interference.

In one embodiment of the invention, a method is provided for filter coefficient selection in a receiver-transmitter pair comprising the following steps. First, training a first filter and a second filter to determine first filter coefficients and second filter coefficients such that the first filter and the second filter have a transfer function inverse to that of a channel, wherein during the training at least one second filter coefficient is forced to a predetermined value. Thereafter, processing the first filter coefficients to isolate minimum phase coefficients and maximum phase coefficients and then transmitting the minimum phase coefficients to a third filter. Next, establishing coefficients of the third filter based on the minimum phase coefficients and setting the first filter coefficients based on the maximum phase coefficients.

In one embodiment, the first filter and the second filter are located in a receiver and the third filter is located in a transmitter. The first filter may comprise a feedforward filter, the second filter may comprise a feedback filter, and the third filter may comprise a precode filter. It is contemplated that the step of transmitting may comprise transmitting the minimum phase coefficients over one or more twisted pair conductors to a precode filter in a transmitter. The processing may comprise performing spectral factorization and forming a polynomial to obtain the minimum phase coefficients and the maximum phase coefficients.

A method for equalizing a signal is also disclosed that comprises receiving a signal transmitted through a communication channel and performing a first equalization process on the signal utilizing a first equalizer having maximum phase coefficient values. Thereafter, performing a second equalization process on the signal utilizing a second equalizer having second equalizer coefficient values wherein the first equalization process and the second equalization process reduce the distorting effects of transmission through the channel.

In one embodiment the first equalizer comprises a feedforward equalizer. Further, at least one of the second equalizer coefficient values may be set to a fixed value during a training stage. The method may further comprise preceding the signal prior to transmission using a precode filter that has coefficients that are based on minimum phase coefficients generated by a training process of the second filter.

In yet another embodiment of performing equalization the first equalizer comprises a feedforward equalizer, the second equalizer comprises a feedback equalizer, and at least one of the first five second equalizer coefficient values are set to zero. Moreover, performing a second equalization process may further include providing a feedback signal to a decision device.

The invention may also be embodied as a system for channel equalization. One such embodiment comprises a first filter configured to utilize one or more first filter coefficients. The first filter may comprise a maximum phase filter. The system also includes 1) a second filter having two or more second filter coefficients wherein at least one of the two or more second filter coefficients are forced to a predetermined value and 2) a precode filter having one or more precode filter coefficients such that the precode filter comprises a minimum phase filter. The first filter and the second filter may be located in a receiver and the precode filter may be located in a transmitter.

In one embodiment the predetermined value comprises zero. The system may further include a processor configured to calculate the first filter coefficients, second filter coefficients and the precode filter coefficients. It is contemplated that the first filter may comprise a feed forward filter and the second filter may comprise a feedback filter. The first filter coefficient values, second filter coefficient values, and precode filter coefficient values may be determined during a training process and one aspect of the training process may comprise spectral factorization.

In yet another embodiment a system is disclosed for exchanging data between a first location and a second location wherein the system comprises a first transceiver comprising a data source interface configured to receive data from a data source, a precode filter configured to equalize the data to at least partially account for transmission through a channel, a digital to analog converter configured to convert the data to a first analog signal, a line driver configured to adjust the power of the first analog signal for transmission over a channel, and a receiver configured to receive data from a second transceiver.

This system may also include a second transceiver with an amplifier configured to receive a second analog signal from the channel such that the second analog signal comprises a distorted version of the first analog signal. The system may also include the following aspects: an analog to digital converter configured to convert the second analog signal to data, a first filter configured to process the data to at least partially reverse the effects of transmission through the channel, a second filter configured to process the data to at least partially reverse the effects of transmission through the channel, a decision device configured to quantize portions of the data into two or more distinct values, and a transmitter configured to transmit precode filter coefficient data to the precode filter in the first transceiver.

In one variation to this embodiment, the precode filter is configured as a minimum phase filter and the first filter is configured as a maximum phase filter. In another variation the second filter comprises a feedback filter having greater than N coefficients and the first N coefficients are set to zero such that N comprises an integer value having magnitude of less than 20. The second transceiver may further comprise a processor configured to calculate coefficients for the precode filter, the first filter, and the second filter.

In another embodiment the method and apparatus disclosed is embodied as a computer program product comprising a computer useable medium having computer program logic recorded thereon for calculating equalizer coefficients. This embodiment comprises computer program code logic configured to perform the following actions: initiate a training sequence, train coefficients of a feedforward filter as a mixed phase filter, train coefficients of a feedback filter, wherein at least one of the coefficients of the feedback filter is set to zero, process the coefficients of the feedforward filter to calculate minimum phase coefficients and maximum phase coefficients, establish the feedforward coefficients based on the maximum phase coefficients, and establish precoder coefficients based on the minimum phase coefficients.

Also contemplated is that the computer program code logic configured to process the coefficients may comprise computer program code logic configured to perform spectral factorization. Furthermore, the process of establishing precoder coefficients based on the minimum phase coefficients may comprise forming a polynomial from the maximum phase feedforward coefficients. It is contemplated that the computer program product may be located in a communication receiver or a transmitter.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1A:
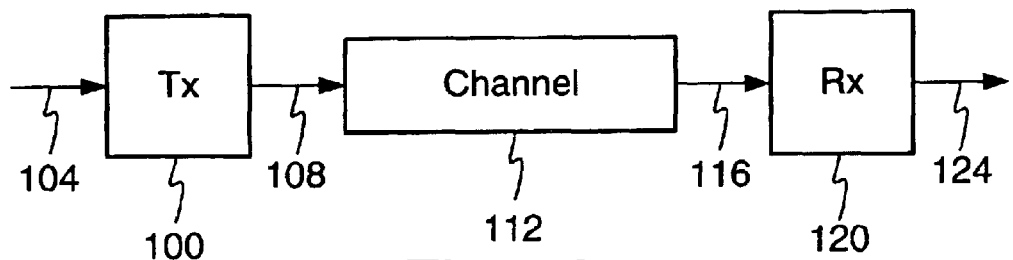
FIG. 1A illustrates a block diagram of an exemplary receiver and transmitter.

FIG. 1A illustrates an example embodiment of a transmitter and a receiver. As shown, a transmitter 100 includes a transmitter input 104 and a transmitter output 108. The output 108 of the transmitter 100 connects to a channel 112. The channel 112 connects to an input 116 of a receiver 120. The receiver 120 includes a receiver output 124. The receiver output 124 may connect to a computing device, terminal, switch, router, network processing device, or any device configured to receive data over the channel 112.

The transmitter 100 may comprise any device configured to transmit data from a first location to a second location.

Likewise, the receiver 120 may comprise any device configured to receive data transmitted from the first location to the second location. It is contemplated that a transmitter 100 and receiver 120 may be located at both ends of the channel 112 to enable transmission in both directions. In one embodiment the transmitter 100 and receiver 120 are located in a network interface card in a network terminal, such as a computer configured as part of a local area network.

The channel 112 may comprise any type communication medium capable of transporting data between a first location and a second location. In one embodiment the channel 112 comprises twisted pair copper wire, such as is compatible with data transmission with certain existing Ethernet communication protocols. Any type channel 112 may be utilized with the method and apparatus described herein including but not limited to fiber optic, coaxial, non-twisted metallic conductors, or a wireless medium.

Figure 1B:
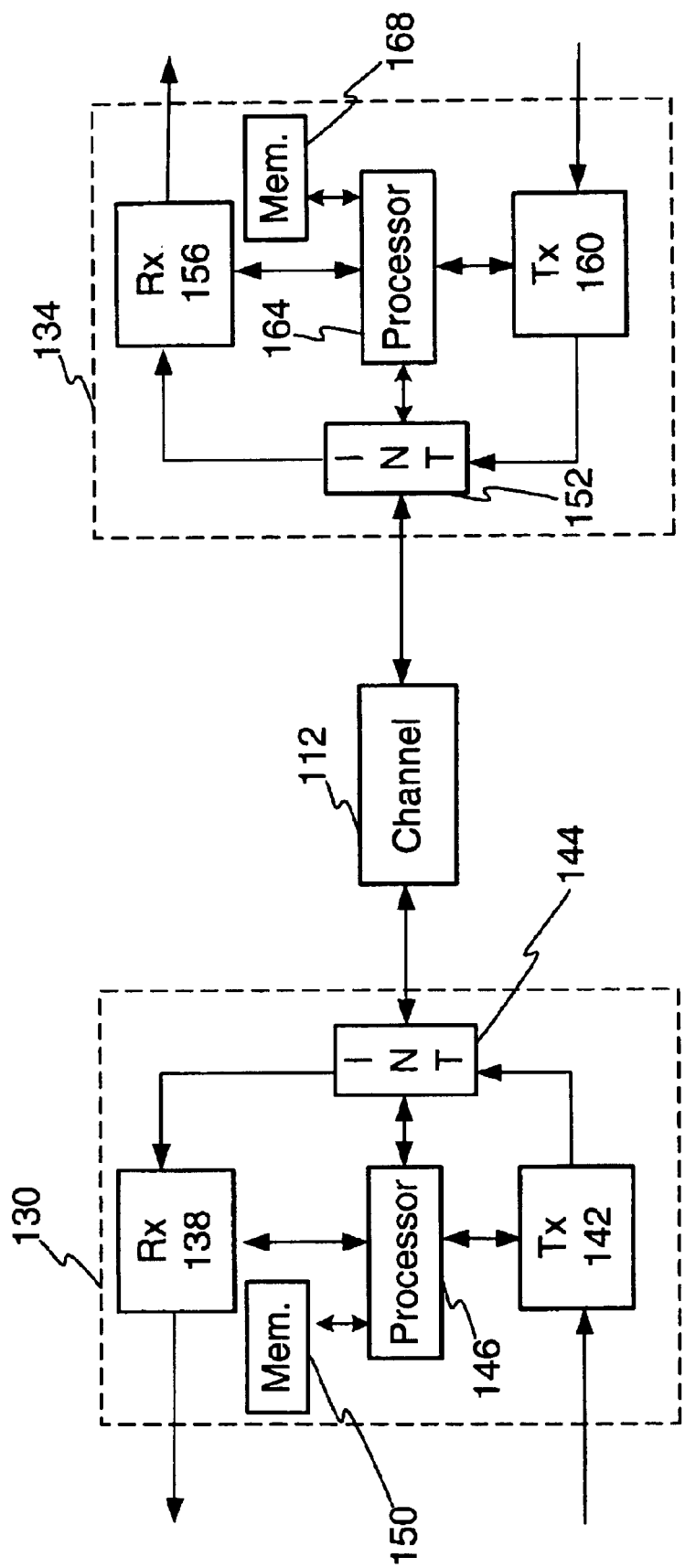
FIG. 1B illustrates a block diagram of an exemplary receiver-transmitter pair.

In reference to FIG. 1B, a block diagram of a receiver/transmitter pair is shown. A channel 112 connects a first transceiver 130 to a second transceiver 134. The first transceiver 130 connects to the channel 112 via an interface 144. The interface 144 is configured to isolate the incoming from outgoing signals. In another embodiment the channel 112 may comprise numerous conductors and hence the interface 144 performs isolation and separates the conductors based on direction of data flow and based on connection to either of a receiver module 138 or a transmitter module 142. The receive module 138 and transmit module 142 may comprise any assembly of hardware, software, or both configured to operate in accordance with the principles described herein.

The receive module 138 and transmit module 142 communicate with a processor 146. The processor 146 may include or communicate with, memory 150. The memory 150 may comprise one or more of the following types of memory: RAM, ROM, hard disk drive, flash memory, or EPROM. The processor 146 may be configured to perform one or more calculations or signal analysis. In one embodiment the processor 146 is configured to execute machine readable code stored on the memory 150. The processor 146 may perform additional signal processing tasks as described below.

The second transceiver 134 is configured similarly to the first transceiver 130. The second transceiver 134 comprises an interface 152 connected to a receiver module 156 and a transmitter module 160. The receiver module 156 and a transmitter module 160 communicate with a processor 164, which in turn connects to a memory 168. Operation occurs as described below in more detail.

Figure 2:
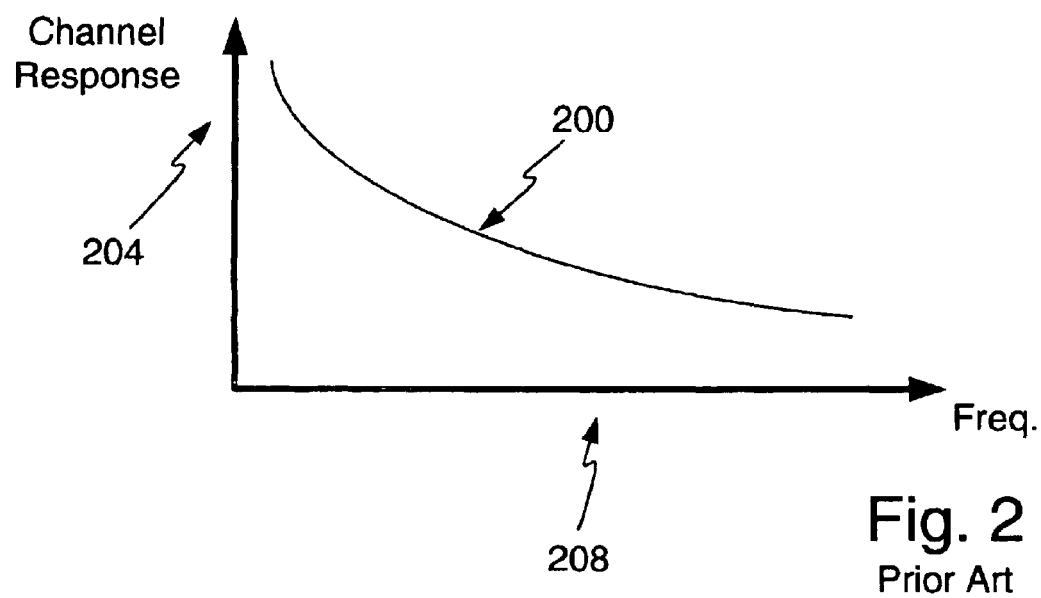
FIG. 2 illustrates an exemplary channel frequency response.

Turning to FIG. 2, an exemplary plot of the frequency response of a channel, such as channel 112 of FIG. 1. A plot of the channel's frequency response 200 is plotted against a vertical axis 204 representing a channel response magnitude while the horizontal axis 208 represents frequency. As can be seen, the channel frequency response is severely attenuated across the available bandwidth.

This will result in a received signal having experienced interference from adjacent pulses. This is often referred to as intersymbol interference or ISI. Intersymbol interference limits the maximum useable bandwidth of a channel by limiting the rate at which pulses, bits, symbols, or signals may be transmitted across the channel. As a result of intersymbol interference, it may be impossible to decode a signal at the receiver, or, if decoding is possible, then an unacceptably high error rate may occur.

The method and apparatus described herein overcomes the bandwidth limiting effects of intersymbol interference thereby allowing greater transmission rates through channels that cause intersymbol interference. While the method and apparatus described herein is capable of operation in numerous different environments and overcoming the signal distorting effects of any type channel, it is particularly well suited to overcome the effects of transmission through twisted pair copper because transmission through twisted pair copper experiences severe intersymbol interference.

Figure 3:
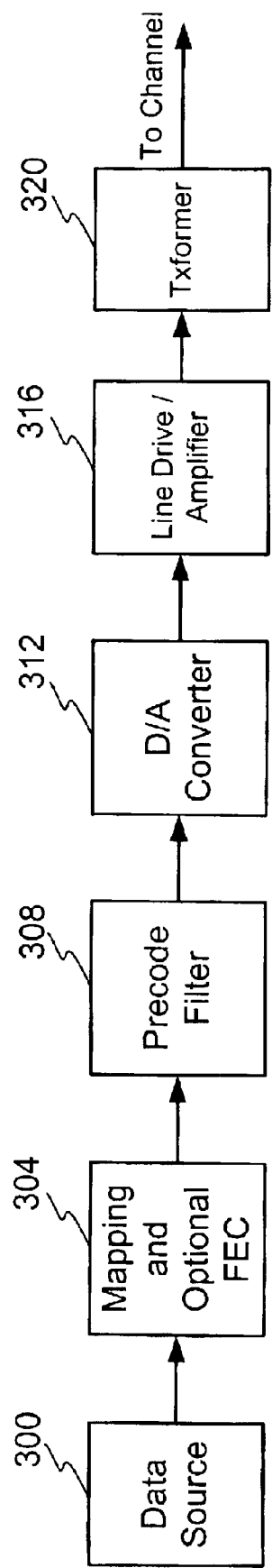
FIG. 3 illustrates an exemplary block diagram of an example embodiment of a transmitter.

In reference to FIG. 3, an exemplary block diagram of an example embodiment of a transmitter is shown. This is but one exemplary embodiment of a transmitter. It is contemplated that other configurations may be embodied by one of ordinary skill in the art. In the exemplary configuration of FIG. 3, a data source 300 connects to a mapping module 304, which in turn connects to a precode filter 308.

The data source 300 may comprise any source of data to be transmitted over a channel. In one embodiment the data source 300 comprises a processing or networking layer of a communication protocol. In one embodiment the data source 300 comprises a network processing device. In one embodiment the data arrives from application software executing on a computer.

The mapping module 304 comprises hardware, software, or a combination of both configured to transform the received binary data into one or more symbols capable or representing one or more bits of binary data. One example mapping that may occur is pulse amplitude modulation (PAM) wherein the several bits of binary data are mapped into a single symbol. Another example of mapping comprises quadrature amplitude modulation (QAM). Through mapping, transmission of a single symbol achieves transmission of several bits of information thereby increasing data transfer rates.

In addition to mapping, the mapping module 304 may incorporate forward error correction (FEC) coding. Examples of FEC coding comprise convolutional coding and trellis coding. It is contemplated that the method and apparatus described herein may be utilized with any form of error correction, or without error correction.

The precode filter 308, which discussed below in greater detail, connects to the output of the mapping module 304 and comprises a signal modification device configured to manipulate the signal to counter the distorting effects of the channel. The precode filter 308 may be configured as a digital filter having coefficient values set to achieve a desired level of signal modification. In one embodiment the precode filter 308 comprises a finite impulse response filter adapted to at least partially negate the distorting effects of a channel. Selection of precode filter coefficients is discussed below in greater detail.

The output of the precode filter 308 connects to a digital to analog (D/A) converter 312 to transform the mapped signal to an analog format. Thereafter, the signal is provided to a line driver/amplifier 316. The line driver/amplifier 316 transforms the signal to a power level suitable for transmission over the channel. The degree or level of amplification may be dependant upon the power limits or specification as defined by a particular communication protocol, crosstalk and coupling concerns, and the distance to a receiver or a repeater. The output of the line driver/amplifier 316 connects to a transformer/hybrid 320. The transformer/hybrid 320 provides isolation between transmit and receive signals as well as the channel itself. The output of the transformer/hybrid 320 connects to a channel.

Figure 4:
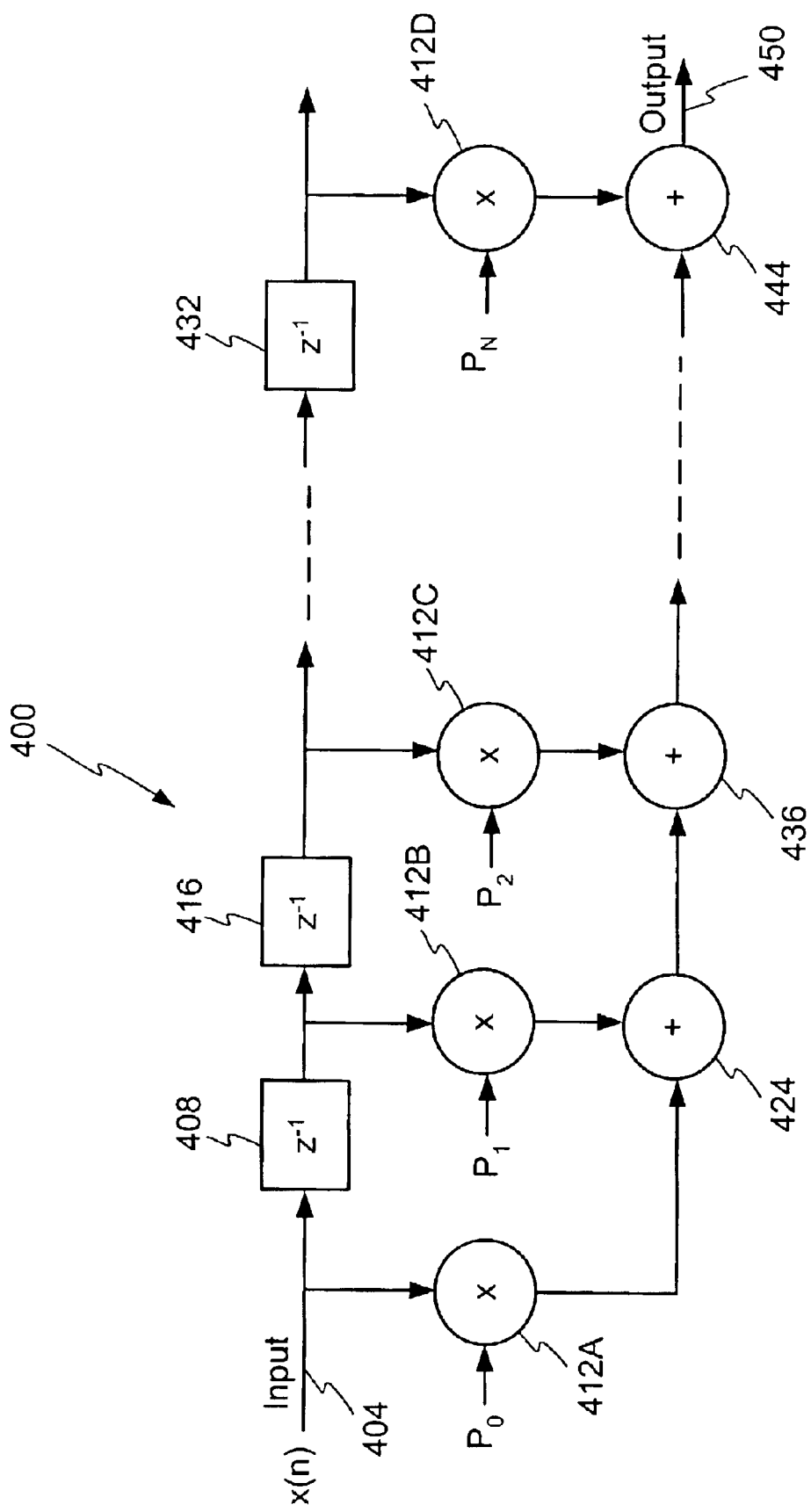
FIG. 4 illustrates a block diagram of an example embodiment of a precode filter embodied as a finite impulse response filter.

FIG. 4 illustrates a block diagram of an example embodiment of a precode filter 400 embodied as a finite impulse response (FIR) filter. As shown in FIG. 4, an input 404 connects to a delay register 408 that is configured to receive and delay for a clock cycle or other period. The input 404 also connects to a multiplier 412A having a multiplier value $P_0$. The output of the multiplier 412A connects to a summing junction 424.

The output of the register 408 connects to multiplier 412B having a multiplier value $P_1$. The output of the multiplier 412B connects to the summing junction 424 to add the output of the multiplier 412B and the multiplier 412A. The output of the register 408 also connects to a register 416, the output of which connects to multiplier 412C. The output of the multiplier 412C connects to the summing junction 436, which also receives the output of summing junction 424. The filter 400 continues in this configuration until connecting to a register 432 that has an output connected to a multiplier 412 D with a multiplier factor $P_N$. The output of multiplier 412D connects to a summing junction 444 that also receives the output of the previous summing junction.

This configuration is N+1 long with the elements of the filter controlling the modification or precoding that occurs on the signal. As a signal propagates through the filter 400 it is affected by the multiplier values of the multipliers 412. In one embodiment, the multiplier values may comprise the filter coefficients. Hence, a signal is output from the filter having been modified based on the values of the multipliers 412.

Figure 5:
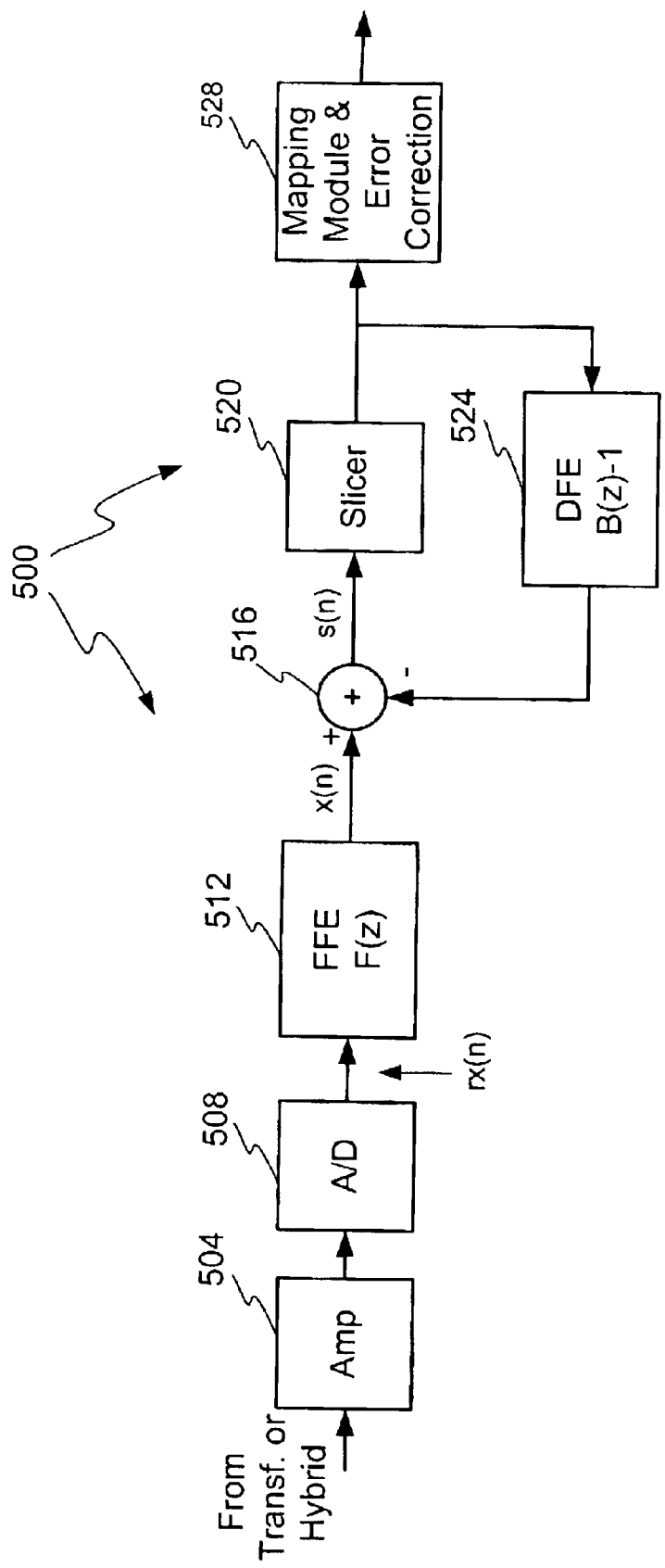
FIG. 5 illustrates a block diagram of an example embodiment of a receiver.

FIG. 5 illustrates a block diagram of an example embodiment of a receiver. This is but one possible receiver configuration. It is contemplated that other receiver configurations may be enabled without departing from the scope of the invention. As shown the receiver 500 comprises an amplifier 504 configured to receive a signal arriving over a channel. The amplifier 504 increases the power level or voltage of the received signal, which may have been attenuated by transmission through the channel. The amplified signal feeds into an analog to digital (A/D) converter 508, which in turn provides a digital signal, rx(n), to a feed forward equalizer (FFE) 512. The output of the FFE, x(n), connects to a summing junction 516. It is contemplated that one of ordinary skill in the art is capable of FFE construction and familiar with basic FFE operation. Accordingly the basic principles of FFE operation are not discussed in detail herein beyond that associated with the new and distinctive features of the invention. It is further contemplated that other filter or equalizer structures, other than an FFE, may be utilized without departing from the scope of the invention.

The summing junction 516 also receives an input from a decision feedback equalizer (DFE) 524. In one embodiment the summing junction subtracts the DFE input from the FFE output. The summing junction 516 provides its output, s(n), to a decision device, such as a slicer 520. The slicer 520 comprises any device capable of analyzing a received signal at particular points in time and quantizing the received signal to two or more distinct values. In one embodiment the slicer operates in conjunction with PAM 10 mapping to quantize its input to one of 10 values. In one embodiment the slicer 520 analyzes the received signal's voltage level, after processing, to determine the symbol sent over the channel. The output of the slicer 520 may comprise binary data or mapped voltage levels.

The slicer 520 provides it output to a de-mapping module 528 and as an input signal to the DFE 524. If the transmitter performed error correction encoding on the signal prior to transmission, then the de-mapping module 528 may perform error correction decoding on the received signal to decrease the bit error rate. The error correction processing, as part of the forward error correction, reduces the effective error rate of the data signal. Forward error correction may occur on binary data or symbols.

It is contemplated that one of ordinary skill in the art is capable of DFE 524 construction and familiar with basic DFE operation. Accordingly the basic principles of DFE operation are not discussed in great detail herein beyond that associated with the new and distinctive features of the invention. It is further contemplated that other filter or equalizer structures, other than an FFE 512 or DFE 524 may be utilized without departing from the scope of the invention.

The FFE 512 and the DFE 524 perform equalization on the received signal to compensate for the distorting effects of the channel. The DFE 524, as part of the feedback, receives and weights past values, which are subsequently subtracted, in the summing junction 516, from the arriving signal. It is contemplated that the FFE 512 and DFE 524 may possess coefficients, or other scaling values, associated with one or more taps or stages of the FFE and the DFE. The coefficient values are selected to achieve desired signal equalization to thereby negate, reverse, or reduce the effects of the channel. In one embodiment the FFE 512 and DFE 524 coefficient value are selected based on the principles described herein.

As an advantage of the method and apparatus described herein the coefficient values of the FFE 512, DFE 524, and the precode filter (element 308, FIG. 3) are calculated and selected to counter the signal distorting effects of the channel while minimizing noise amplification and minimizing the undesirable effects of error propagation through the DFE feedback loop. Through these desirable properties data communication is enabled at rates here before unattainable over certain channels and utilizing the components described herein. Moreover, complexity of all system components is capable of being realized with existing integrated circuit processes and construction. Similarly, the complexity of the processing is capable of being performed within time limits available during high speed data communication.

A discussion regarding coefficient calculation is now provided. It should be noted that although specified as particular filter configurations for purposes of discussion, it is contemplated that any type filter or signal modification device may replace the DFE, the FFE, or the precode filter.

Figure 6A:
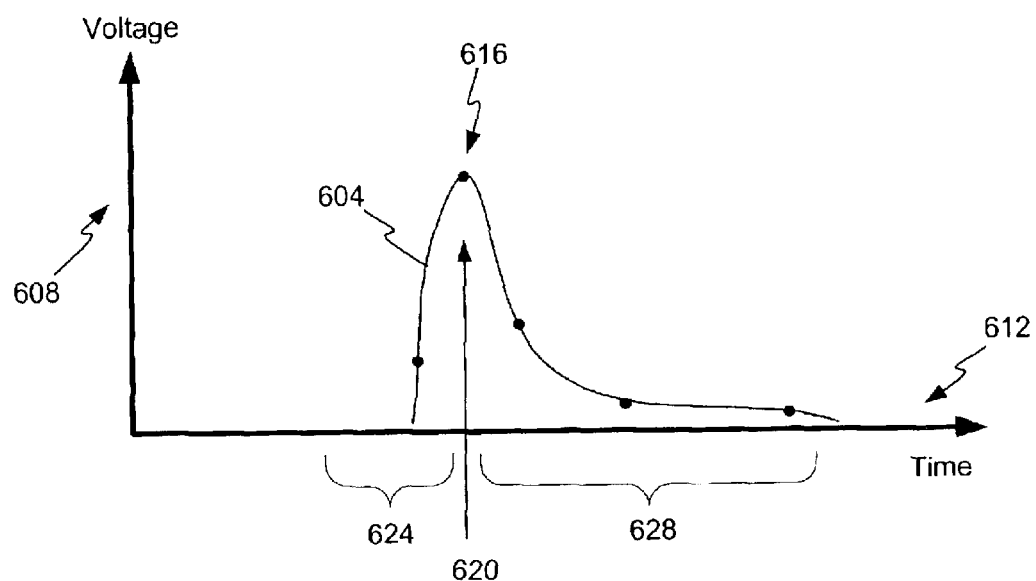
FIG. 6A illustrates an exemplary plot of a received signal pulse.

FIG. 6A illustrates an exemplary plot of an exemplary received pulse. The received signal is the superposition of many pulses scaled by the data symbol. As shown, a received pulse 604 is shown as a function of voltage represented on a vertical axis 608 and time on a horizontal axis 612. A main cursor 620 identifies a sampling point 616. The sampling point may be considered the point at which a slicer determines the values of the data symbols. Sample points arriving prior to the main cursor 620 are defined as pre-cursor points 624 while sample points arriving after the main cursor are defined as post-cursor points 628. In one embodiment, DFE operation is directed primarily to post-cursor intersymbol interference mitigation while the FFE operation is directed to pre-cursor intersymbol interference mitigation. In one embodiment it is desired to achieve FFE operation such that a pulse, received through the channel and after processing by the FFE would be monic and minimum phase, i.e. all the pre-cursor information is eliminated.

Figure 6B:
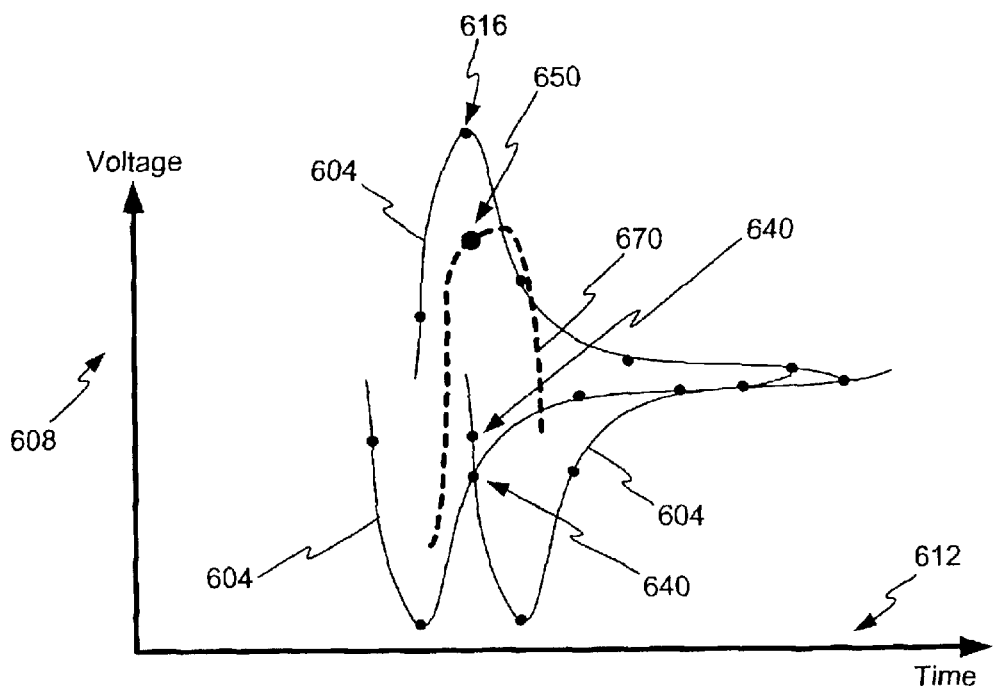
FIG. 6B illustrates an exemplary plot of a received signal containing intersymbol interference components.

FIG. 6B illustrates an exemplary plot of an exemplary received signal 670 with intersymbol interference. As compared to FIG. 6A, like elements are labeled with identical reference numerals. For purposes of discussion, intersymbol interference signal samples 640 are shown in addition to the desired signal sample 616. It is contemplated that the intersymbol interference signal samples 640 may interfere, due to channel distortion, with the desired signal samples 616 to produce a sample 650 of the received signal 670. As can be understood, the desired sample 616 will combine with the interference samples 640 to create a signal having a reduced magnitude 650. While an extreme example, it can be understood that in the absence of channel equalization, the slicer, when presented with the reduced voltage magnitude 650, will result in an incorrect decision. This creates a symbol error and is particularly troublesome because, in certain mapping schemes, each symbol can equate to many binary bits. The method and apparatus described herein achieves equalization and overcomes these drawbacks.

By way of introduction and referring to FIG. 5, a receiver output, prior to equalization, can be defined by the convolution;

$$r_x(n) = \sum_{h=-K_1}^{K_2} C_h d_{n-h} = C(n) \otimes d(n)$$

which can be expanded to;

$$r_x(n) = C_{-K_1} d_{n+K_1} + \ldots + C_0 d_n + \ldots + C_{K_2} d_{n-K_2}$$

where the value $C_0 d_n$ represent the main cursor and the terms prior to $C_0 d_n$ represent pre-cursor terms while the terms after $C_0 d_n$ represent post-cursor terms. The variable C represents the coefficients of the equivalent channel, d represents data symbols and the variable n represents a sampling time. Accordingly, n is the current sampling time while n−1 represents a previous sampling time.

Similarly, the FFE output may be represented as;

$$x(n) = f(n) \otimes r(n)$$

and this representation may be expanded as;

$$x(n) = d_n + C'_1 d_{n-1} + \ldots + C'_{K_3} d_{n-K_3}$$

As can be seen, the FFE is configured to eliminate the pre-cursor terms while the main cursor and $K_3$ post-cursor terms remain. Stated another way, the main cursor $d_n$ and the terms to the right of the main cursor are left to form the output of the FFE.

If the DFE coefficients are chosen to be $\{b_n\}$, then the slicer input can be defined as;

$$s(n) = x(n) - b_1 \hat{d}_{n-1} - \ldots - b_{K_4} \hat{d}_{n-K_4}$$

where $\hat{d}$ is an estimate and may be equal to d.

Thus for correctly fedback symbol decisions when $\hat{d}$ equals d, then;

$$s(n) = d(n)$$

provided $K_4$ is greater than or equal to $K_3$ and $$b_k = \begin{cases} C'_k & k = 1 \ldots K_3 \\ 0 & \text{otherwise} \end{cases}$$

when $K_4$ is less than $K_3$, there will be some residual uncancelled post cursor ISI. These equations may be considered to define the signals and their processing within the receiver.

As discussed above, if incorrect decisions are made by the slicer, these incorrect decisions are fed back into the DFE and error propagation occurs. As a result of the feedback, the errors may build upon themselves. In embodiments having forward error correction processing subsequent to the DFE, this error propagation may result in long strings of errors being presented to the forward error correction processing. The problems are compounded since the slicer operates without the coding gain provided by the forward error correction. Hence the slicer error rate is higher thereby increasing the likelihood of error propagation. Consequently, the communication session must be closed and restarted. This is generally undesirable.

In one embodiment of the method and apparatus described herein, coefficients are selected to overcome the drawbacks of the prior art based on a partial precoding method. In summary, precoding occurs for only a limited number of post-cursors and FFE processing and DFE processing also occurs at the receiver. Selection or calculation of the coefficients for the precoder, FFE, and DFE occur as described below. Based on the coefficient selection and the inclusion of a precoder, FFE, and DFE the pre and post cursor intersymbol interference is eliminated or reduced and error propagation is reduced to an acceptable level or eliminated. Moreover, the peak to average (PAR) value of the signal presented to the receiver is within acceptable limits and error propagation is minimized or eliminated.

As described above, the FFE may be represented as the coefficients of a polynomial. Thus, the polynomial may be represented as;

$$F(z) = f_0 + f_1 z^{-1} + \ldots + f_K z^{-K}$$

which may be factored in product form as;

$$F(z) = \prod_{k=1}^{K} (1 - r_k z^{-1}) = (1 - r_1 z^{-1})(1 - r_2 z^{-1}) \ldots (1 - r_K z^{-1})$$

where r is a function of the f values and are the roots of the polynomial. In an expanded form this may be considered a $K^{th}$ order polynomial. It should be further understood that this resulting $K^{th}$ order polynomial may be factored into the minimum phase roots and the maximum phase roots. The minimum phase roots are defined as all roots where the absolute value of $r_k < 1$ for all k and the maximum phase roots are defined as all roots where the absolute value of $r_k > 1$ for all k. The case with equality to one can not occur in practice with channels having finite frequency responses. In general, a trained FFE is a maximum phase type system. In general, a trained DFE tends to be minimum phase. It follows that mixed phase systems include root values that have magnitude both greater than and less than 1. Working from this understanding regarding a trained FFE filter, the discussion of a method of training, as contemplated by the invention, may occur.

Figure 7:
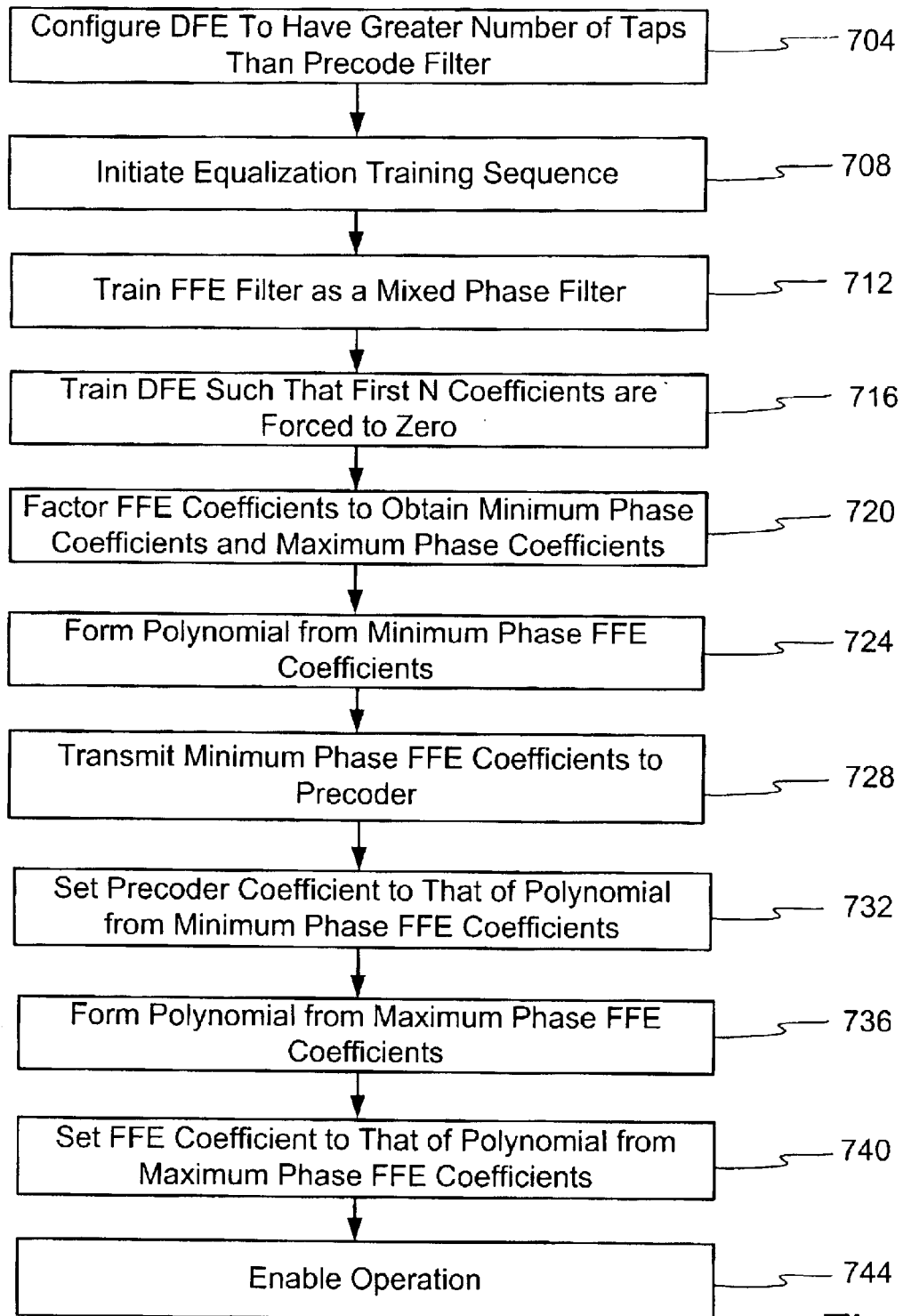
FIG. 7 illustrates an operational flow diagram of an example method of operation.

Next, to achieve the benefits of the equalization and preceding described herein, reference is made to FIG. 7. FIG. 7 illustrates an operational flow diagram of an exemplary method of operation. In general the method described herein performs training and processing to establish precoder coefficients and equalizer coefficients for the FFE and the DFE. As a result, the precoder in the transmitter operates to reduce or eliminate the part of post-cursor interference which contributes most to error propagation while the FFE in the receiver operates to reduce or eliminate pre-cursor interference. The DFE in the receiver operates to eliminate residual post cursor interference. In one embodiment the length, i.e. the number of taps, and hence number of coefficients of the DFE is made to be greater than the number of coefficients in the precoder given by N+1. Thus, at a step 704 the DFE is configured with more taps than an associated precode filter. Hence there is a greater number of taps in the DFE than the number of post-cursors that are to be precoded by the precode filter.

It should also be noted that the initial coefficient values in a DFE have the largest influence on the DFE. Hence, the first N DFE taps are considered to have the greatest effect on the operation of the DFE output. Hence an error by the slicer that is fed back to the DFE when the first N coefficients of the DFE are set to zero is less likely to propagate additional errors than a DFE with the first N coefficients set to non-zero values. Thus, setting the first N coefficients of the DFE to zero reduces the likelihood of additional errors in subsequent decisions by a slicer. The use of the precoder to effect the first N taps of the DFE filter is discussed below in more detail.

Next, at a step 708, a training process is initiated. Training comprises a process of filter coefficient calculation. In one embodiment the training occurs each time the receiver or transmitter is energized or activated. In another embodiment training occurs during design of the system and the filter coefficients are hardcoded. At a step 712, the FFE is trained as a mixed phase filter and not as the typical maximum phase filter. Stated another way, a training event occurs whereby the coefficients of the taps of the FFE are determined. As a parameter, the FFE is configured to include both minimum and maximum phase terms, and hence it is mixed phase. It is contemplated that the training may comprise real time operation that occurs when a communication begins as part of an exchange of data between a transmitter and a receiver. A known or predetermined sequence may be utilized or a random or pseudorandom sequence may be utilized, such as would be required in the least mean square (LMS) algorithm for coefficient determination.

It is further contemplated that an assumption may be made that all devices will encounter a known channel. If such an assumption is made, then an estimate of an exemplary channel may be arrived at during a design state of the system and the equalizer system may be hardcoded or hardwired with these predetermined values. In such an embodiment the training process would not occur every time a communication session begins, but instead during device design or manufacture. Training may be achieved using hardware or software systems or a combination thereof. Processor or machine executable code may be stored in a memory and executed on a processor to determine the coefficient values. Hard coded logic, delays, summing junctions, multipliers or any other hardware may be utilized for training. It is contemplated that the method described herein may occur using computer program product comprising a computer useable medium having computer program logic recorded thereon, or hardware, or a combination of both.

Concurrently or thereafter at a step 716, the DFE is trained such that the first N coefficients are forced to zero while the tail may assume non-zero values. The tail is defined as filter coefficient values other than the first N. In one embodiment, the first N coefficient values are set to zero prior to training, and thereafter training occurs. In one embodiment this comprises executing any training processes, such as that described above to determine FFE coefficient values while concurrently setting the first N coefficients to a predetermined value. It is contemplated that in other embodiments the first N coefficients maybe set to a predetermined value other than zero. In one embodiment the FFE and DFE are trained simultaneously.

The term N represents an arbitrary number selected based on the particular design parameters and desired filter/equalizer complexity. In one embodiment N is selected such that the value N is sufficient to reduce or eliminate catastrophic failure as a result of feedback of errors to the slicer. By setting the first N coefficients of the DFE to zero, the significance of the DFE in signal equalization is reduced and hence the chance of error propagation is reduced. In one embodiment N is set to 4. In other embodiments the value of N may range from 1 to 50.

To account for the first N coefficients being set to zero or some other predetermined value, the method and apparatus implements a precoder, having responsibility for preceding (equalizing) the effects of the first N post cursors that would have otherwise been equalized by the DFE. Further, there need not be a one-to-one correspondence between the number of DFE coefficients that are forced to zero and the level of preceding.

As a result of the first N coefficients of the DFE being set to zero during training and the FFE filter being concurrently trained, the main tap of the FFE filter is adjusted or shifted by N cursor positions. Stated another way and in the exemplary case of a tap delay line configuration, the main cursor location is not the last tap, but N taps preceding the last tap.

At this stage in the initial coefficient calculation process, precoding is not present and due to the first N DFE coefficients being set to zero, the FFE training results in FFE coefficients values that account for both post cursor interference and pre-cursor interference. Hence the FFE is a mixed phase filter. Absent further equalization or coefficient adjustment, such as by use of a precode filter, the system, and in particular the FFE would undesirably enhance noise. This occurs because a mixed phase FFE enhances noise.

To overcome the noise enhancement effect, the method performs spectral factorization on the coefficients of the trained FFE. This occurs at step 720. The roots of the mixed phase FFE (F') may be represented as;

$$F'(z) = \prod_{k=1}^{K} (1 - r'_k z^{-1}) = (1 - r'_1 z^{-1})(1 - r'_2 z^{-1}) \ldots (1 - r'_K z^{-1})$$

From this equation, the roots are represented by the variable $r'_k$. As part of step 720 processing occurs to identify all the $r'_k$ values having magnitude of less than one. These are defined as the minimum phase roots. Any root finding algorithm maybe used to find the roots. The algorithm may be implemented in hardware, software or some combination of both. Step 720 also comprises identifying all the $r_k$ values that have magnitude greater than 1. These are defined as the maximum phase roots.

For the minimum phase roots, P(z), representing the transmitter precoder function, may be represented in factored form;

$$P(z) = \prod_{k=\min\ phase} (1 - r'_k z^{-1})$$

which may be expanded into a polynomial in z, at step 724, as shown below, where {p} equals a coefficient value and $z^{-1}$ represents the unit of delay in a tap delay line filter.

$$P(z) = p_0 + p_1 z^{-1} + \ldots + p_N z^{-N}$$

This set of coefficient values {p} are, at a step 728, communicated back to the transmitter associated with the receiver. Then at a step 732, these coefficient values become the precoder coefficient values for the precoder located in the transmitter.

In summary of steps 720–732, the FFE coefficients, determined by training at step 712, are subject to spectral factorization and the minimum phase roots are identified and formed into a polynomial. The coefficients of this polynomial are transmitted to the precode filter and serve as the precoder coefficient values. Hence, the precoder filter coefficients are established.

Next or concurrently, it is desired to determine the final FFE coefficients. At previous step 720, spectral factorization was performed on the trained FFE coefficients. In contrast to identifying the minimum phase roots, which were used to determine the precoder filter coefficients, the operation now identifies the maximum phase roots, i.e. the roots having magnitude greater than 1 for all k values. Any root finding algorithm maybe used to find the roots. The algorithm may be implemented as either hardware, software or some combination of both. These roots may be represented as;

$$F(z) = \prod_{k=\max\ phase} (1 - r'_k z^{-1})$$

which may be expanded into a polynomial in z, at step 736, as shown below, where f represents a coefficient value and $z^{-1}$ represents a unit of delay in the tap delay line filter.

$$F(z) = f_0 + f_1 z^{-1} + \ldots + f_M z^{-M}$$

F'(z) (non-factored) differs from F(z) (factored and non-prime) in that F'(z) is a mixed phase filter which has yet to undergo spectral factorization while F(z) represent the FFE filter configured with the maximum phase roots of the factored polynomial resulting from the factorization of the coefficients of F'(z).

At a step 740, the coefficients of this polynomial become the coefficients of the FFE filter in the receiver. The trained FFE coefficients from step 712 are thus replaced by the coefficients of the polynomial derived from the maximum phase roots after spectral factorization. Thereafter, at a step 744, communication using the receiver and transmitter pair may be enabled.

Hence, in summary of one embodiment, the DFE coefficients and FFE coefficients are determined during the training process described above in conjunction with steps 712 and 716, with the first N coefficient values of the DFE set to zero or some other value. The precoder coefficients are determined to be the minimum phase roots of the factored polynomial derived from the trained FFE coefficients. This occurs at step 732. Finally, the FFE coefficients are set as the maximum phase roots of the factored polynomial derived from the trained FFE. This occurs at step 740.

One advantage of the method and apparatus described herein is that in one embodiment or variation the DFE or other filter may be made to adapt during operation in data mode. Data mode is defined to mean a time period when the transmitter/receiver pair operates to transmit data, such as data from a data source. Data mode is in contrast to training mode, handshake mode or start-up. Adaptation of the filter coefficients during data mode allows the filter to deal with, i.e. adapt, to changes in the channel that may occur over time. While it is assumed during the initial training process that the coefficients accurately equalize the channel, the values resulting from the initial training may be slightly incorrect or the channel transfer function may change over time. For DFE adaptation during data mode, the first N coefficients may be maintained at zero and the remaining coefficients are adapted in real time during data mode. In another embodiment one or more of the first N coefficients may be modified. For FFE adaptation during data mode, the coefficients are adapted in real time. Alternatively, the FFE could be trained as a mixed phase filter to compensate for the fixed precoder which, in some embodiments, may not easily be adapted during data mode. It is contemplated that the precoder could be adapted during data mode via a side channel or in any other manner.

Another advantage of the method and apparatus described herein is evident in comparison to Tomlinson-Harashima type precoding (TH precoding). TH precoding teaches away from the approach described herein by eliminating the DFE. TH preceding eliminates the use of the DFE in the receiver thereby eliminating any possibility of error propagation. However, TH preceding suffers from the disadvantages of lacking data mode adaptation. Lack of adaptation during data mode, results in a less effective equalizer because of the inability to adapt to changing channel conditions.

Further TH precoding results in a transmitted signal having a large received PAR value. PAR is defined as peak to average value of a signal. A large PAR value results in a more challenging and expensive analog front end at the receiver. As a result of a large PAR value of a received signal, the analog to digital converter at the receiver may require more converter bits than with a signal having a smaller PAR value. This requirement limits the sampling rate of the converter and as a result limits its use in high speed applications. With the method and apparatus described herein, the received signal possesses a desirable, i.e. lower, PAR value.

Alternative Embodiments

In an alternative embodiment, the FFE may be configured, during steps 736, 740, as a mixed phase system. To achieve a mixed phase FFE, step 712 and 716 would occur by training the FFE and DFE. Thereafter, in accordance with step 720, the system factors the roots of the polynomial formed from the FFE coefficients and the precoder filter coefficients are set. Instead of using the maximum phase roots of F'(z) as the final FFE coefficients as contemplated by step 736, the operation, either during data mode or during training, may re-train the FFE and DFE with the precode filter in the loop, i.e. operating. In one embodiment, the first N coefficient would be forced to zero during this re-training process. As a result, the FFE will become a mixed phase system. Although the FFE may introduce a minimal amount of noise enhancement, this embodiment reduces the complexity of the system and the training process while still providing desirable equalization and reducing error propagation. This embodiment also compensates for any inaccuracies that may occur during the estimation of the precoder coefficients.

In another alternative embodiment, the FFE coefficients may be left as was determined at step 712, but appended with zeros (or some other value) to reduce the noise enhancement. Since, the partial ISI components that generate the postcursor components are being dealt with at the transmitter, it is possible to set the coefficients of the FFE that would otherwise equalize the pre-cursor components of the received signal to zero or some other value. Because one or more of these coefficients are set to zero or some other small value, the noise enhancement is reduced or eliminated. This reduces the complexity of the system and the training process while providing the equalization advantages discussed above.

While various embodiments of the invention have been described, it will be apparent to those of ordinary skill in the art that many more embodiments and implementations are possible that are within the scope of this invention.

What is claimed is:

1. A method for filter coefficient selection in a receiver-transmitter pair comprising:
   training a first filter and a second filter to determine first filter coefficients and second filter coefficients such that the first filter and the second filter have a transfer function inverse to that of a channel, wherein: during the training at least one second filter coefficient is forced to a predetermined value;
   the first filter and the second filter are located in a receiver and a third filter is located in a transmitter;
   the first filter comprises a feedforward filter, the second filter comprises a feedback filter, and the third filter comprises a precode filter;
   processing the first filter coefficients to isolate minimum phase coefficients and maximum phase coefficients;
   transmitting the minimum phase coefficients to a third filter;
   establishing coefficients of the third filter based on the minimum phase coefficients; and
   setting the first filter coefficients based on the maximum phase coefficients.

2. The method of claim 1, wherein transmitting comprises transmitting the minimum phase coefficients over one or more twisted pair conductors to a precode filter in a transmitter.

3. The method of claim 1, wherein processing comprises performing spectral factorization.

4. The method of claim 3, wherein processing further comprises forming a polynomial to obtain the minimum phase coefficients and the maximum phase coefficients.

5. The method of claim 1, wherein the at least one second filter coefficient that is forced to a predetermined value comprises four second filter coefficients that are forced to zero.

6. The method of claim 5, wherein the third filter comprises a five tap precode filter.

7. A method for equalizing a signal comprising:
   receiving a signal at a precode equalizer, the signal to be transmitted through a channel;
   processing the signal with the precode equalizer to pre-equalize the signal, wherein the precode equalizer utilizes minimum phase coefficients generated from the spectral factorization of the coefficients from a first equalizer, which is located at a receiver, during a training process;
   receiving the signal, at the receiver, after transmission through the channel;
   performing a first equalization process on the signal utilizing the first equalizer having maximum phase coefficients values, which are isolated from the spectral factorization of the coefficients from the first equalizer during the training process; and
   performing a second equalization process on the signal utilizing a second equalizer, which is located at the receiver and configured with second equalizer coefficient values, wherein at least one of the second equalizer coefficient values are set to a predetermined value during the training process;
   wherein the first equalization process and the second equalization process reduce the effects of transmission through the channel wherein the first equalizer comprises a feedforward equalizer and the second equalizer comprises a feedback equalizer.

8. The method of claim 7, wherein at least one of the second equalizer coefficient values are set to a fixed value during the second equalization process.

9. The method of claim 8, wherein the at least one of the second equalizer coefficient values comprises the first four second equalizer coefficient values and wherein a fixed value comprises a zero value.

10. The method of claim 7, wherein setting at least one of the second equalizer coefficient values to a predetermined value reduces error propagation associated with the second equalizer.

11. The method of claim 7, wherein the first equalizer comprises a feedforward equalizer, the second equalizer comprises a feedback equalizer, and at least one of the first five second equalizer coefficient values are set to zero.

12. The method of claim 7, wherein performing a second equalization process further includes providing a feedback signal to a decision device.

13. A system for channel equalization comprising:
   a first filter configured to utilize one or more first filter coefficients, the first filter comprising maximum phase filter;
   a second filter having two or more second filter coefficients with at least one of the two or more second filter coefficients forced to a predetermined value; and
   a precode filter having one or more precode filter coefficients, the precode filter comprising one or more minimum phase coefficients based on the coefficients of the first filter;
   wherein the first filter and the second filter are located in a receiver and the precode filter is located in a transmitter and wherein the first filter, second filter and precode filter are trained with coefficient values to operate as a system to equalize a signal and during training the second filter has one or more coefficient forced to a predetermined value.

14. The system of claim 13, wherein the predetermined value comprises zero.

15. The system of claim 13, further including a processor configured to calculate the first filter coefficients, second filter coefficients and the precode filter coefficients.

16. The system of claim 13, wherein the first filter comprises a feed forward filter and the second filter comprises a feedback filter.

17. The system of claim 13, wherein the first filter, second filter and precode
   filter coefficient values are determined during a training process and one aspect of the training process comprises spectral factorization of the first filter coefficients.

18. A system for exchanging data between a first location and a second location, the system comprising:
   a first transceiver comprising:
      a data source interface configured to receive data from a data source;
      a precode filter configured to equalize the data to at least partially account for transmission through a channel;
      a digital to analog converter configured to convert the data to a first analog signal;
      a line driver configured to adjust the power of the first analog signal for transmission over a channel;
      a receiver configured to receive data from a second transceiver;
   a second transceiver comprising:
      an amplifier configured to receive a second analog signal from the channel, the second analog signal comprising a distorted version of the first analog signal;

an analog to digital converter configured to convert the second analog signal to data;

a first filter configured to process the data to at least partially reverse the effects of transmission through the channel;

a second filter configured to process the data to at least partially reverse the effects of transmission through the channel;

a decision device configured to quantize portions of the data into two or more distinct values;

a transmitter configured to transmit precode filter coefficient data to the precode filter in the first transceiver;

wherein the precode filter coefficient data is generated by processing the first filter coefficients, which are generated during training while at least one coefficient of the second filter is set to zero, to isolate minimum phase coefficients of the first filter coefficients.

19. The system of claim 18, wherein the precode filter is configured as a minimum phase filter and the first filter is configured as a maximum phase filter.

20. The system of claim 18, wherein second filter comprises a feedback filter having greater than N coefficients and the first N coefficients are set to zero, wherein N comprises an integer value having magnitude of less than 20.

21. The system of claim 18, wherein the second transceiver further comprises a processor configured to calculate coefficients for the precode filter, the first filter, and the second filter.

22. A computer program product comprising a computer useable medium having computer program logic recorded thereon for calculating equalizer coefficients, comprising:

computer program code logic configured to initiate a training sequence;

computer program code logic configured to train coefficients of a feedforward filter as a mixed phase filter;

computer program code logic configured to train coefficients of a feedback filter, wherein at least one of the coefficients of the feedback filter is set to zero;

computer program code logic configured to process the coefficients of the feedforward filter to calculate minimum phase coefficients and maximum phase coefficients;

computer program code logic configured to establish the feedforward coefficients based on the maximum phase coefficients; and computer program code logic configured to establish precoder coefficients based on the minimum phase coefficients of the feedforward filter wherein the feedforward and feedback filter are located in a receiver and the precoder is located in a transmitter.

23. The computer program product of claim 22, wherein computer program code logic configured to process the coefficients comprises computer program code logic configured to perform spectral factorization.

24. The computer program product of claim 22, wherein establishing precoder coefficients based on the minimum phase coefficients comprises forming a polynomial from the maximum phase feedforward coefficients.

25. The computer program product of claim 22, wherein the computer program product is located in a communication receiver.

* * * * *